No. 795,877. PATENTED AUG. 1, 1905.
W. E. WILLIAMS.
MATCH SPLINT ASSEMBLING MACHINE.
APPLICATION FILED AUG. 8, 1898. RENEWED NOV. 1, 1900.

11 SHEETS—SHEET 1.

Witnesses:
Jas E Hutchinson
Geo. B. Prindle

Inventor.
Wm. E. Williams,
by Edwin J. Prindle, his Atty

No. 795,877. PATENTED AUG. 1, 1905.
W. E. WILLIAMS.
MATCH SPLINT ASSEMBLING MACHINE.
APPLICATION FILED AUG. 8, 1898. RENEWED NOV. 1, 1900.

11 SHEETS—SHEET 7.

Witnesses.
Jas. E. Hutchinson
Geo. B. Prindle

Inventor.
Wm. E. Williams,
by Edwin J. Prindle, his Atty.

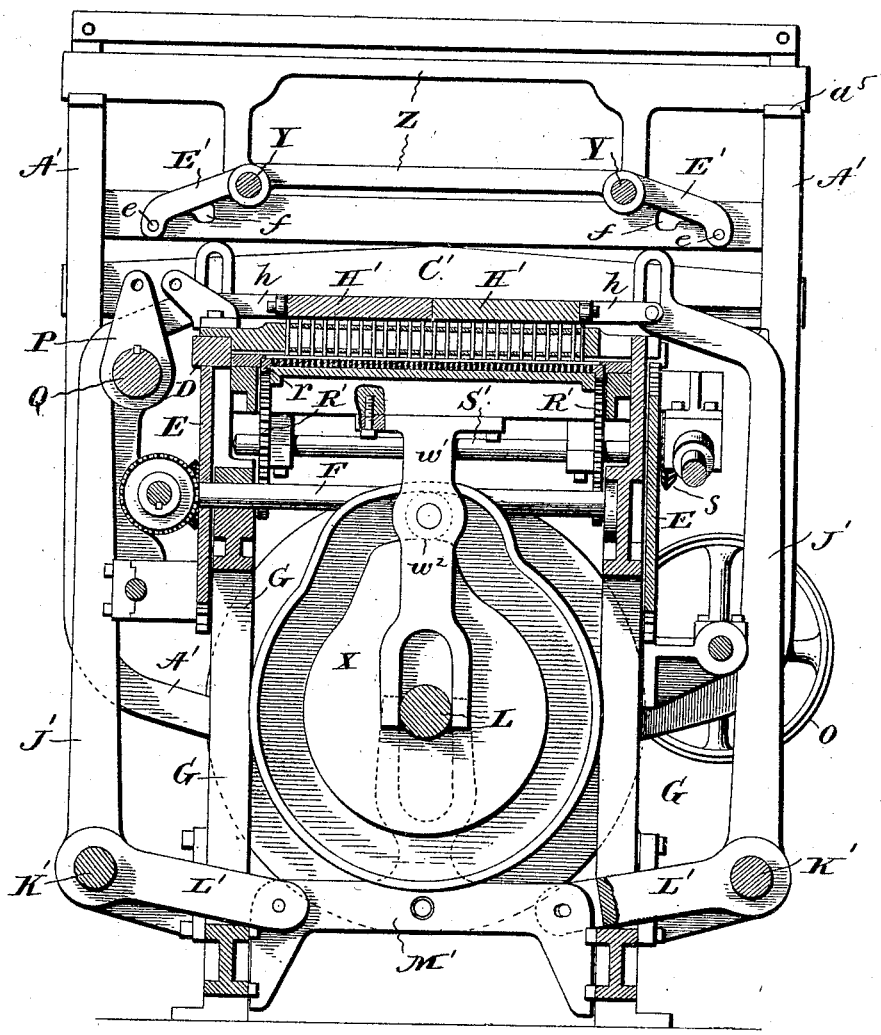

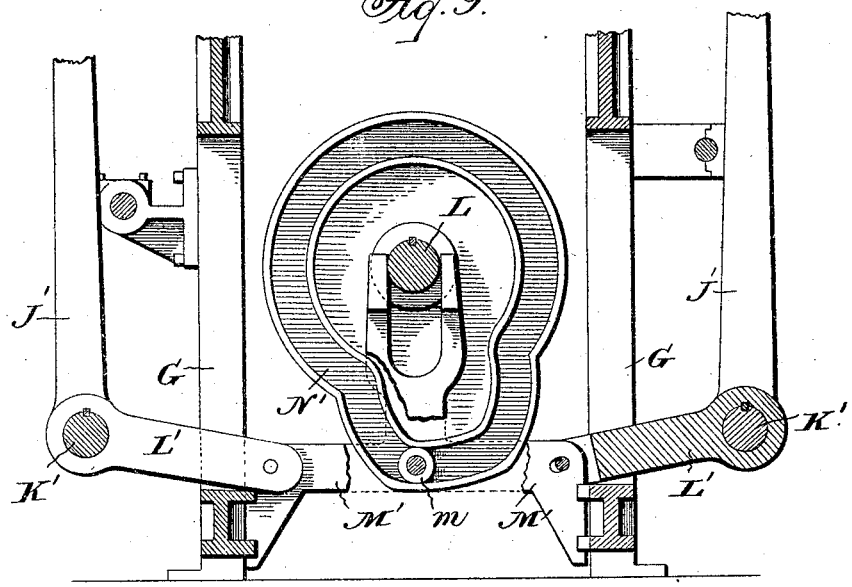
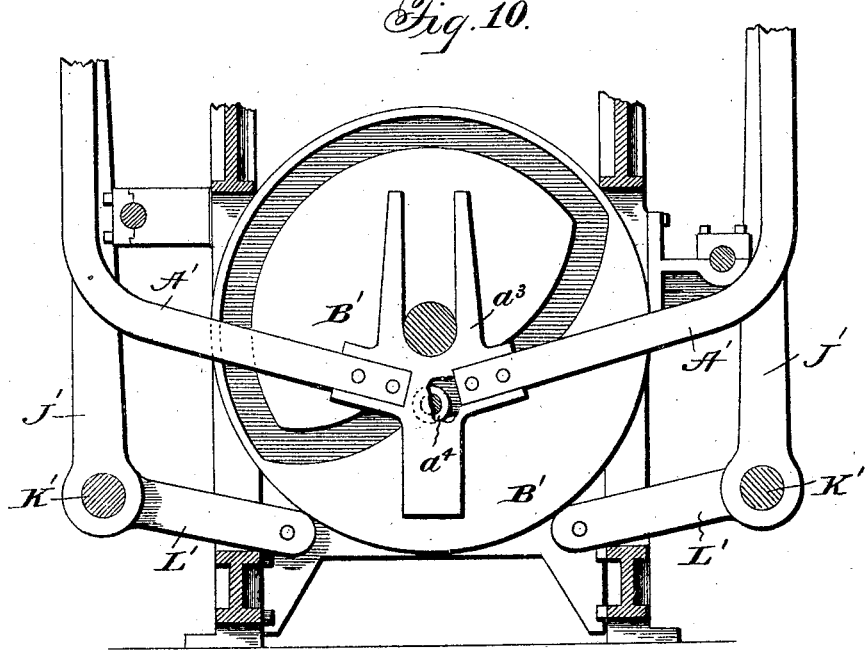

No. 795,877. PATENTED AUG. 1, 1905.
W. E. WILLIAMS.
MATCH SPLINT ASSEMBLING MACHINE.
APPLICATION FILED AUG. 8, 1898. RENEWED NOV. 1, 1900.
11 SHEETS—SHEET 10.
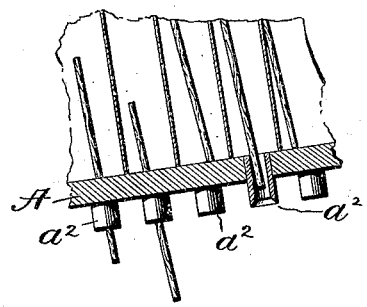
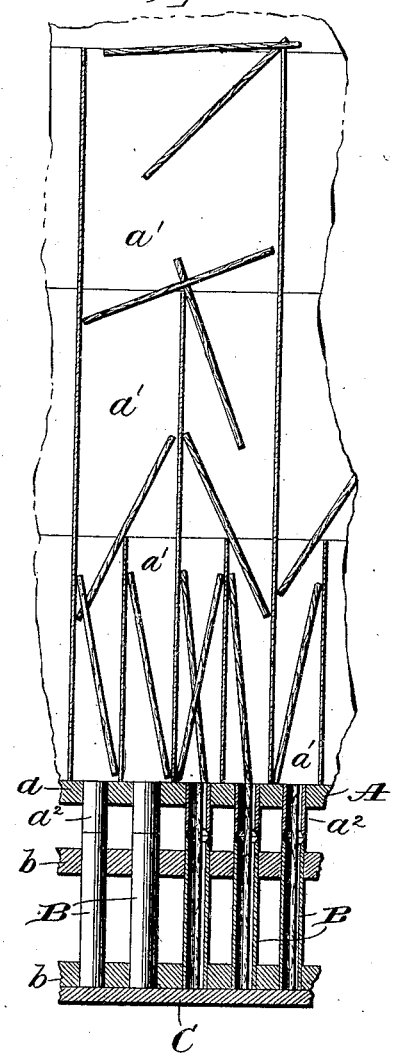
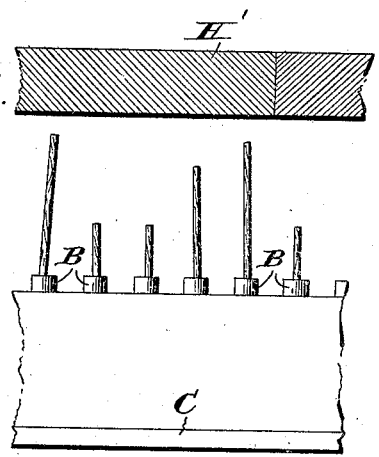
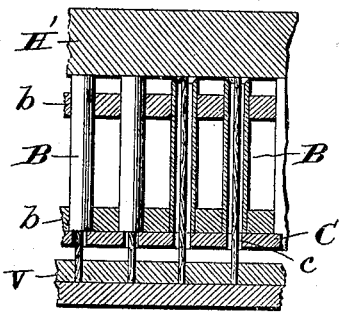
Witnesses:
Jas. E. Hutchinson
Geo. B. Prindle
Inventor.
Wm. E. Williams,
by Edwin J. Prindle, his Atty.

No. 795,877. PATENTED AUG. 1, 1905.
W. E. WILLIAMS.
MATCH SPLINT ASSEMBLING MACHINE.
APPLICATION FILED AUG. 8, 1898. RENEWED NOV. 1, 1900.
11 SHEETS—SHEET 11.
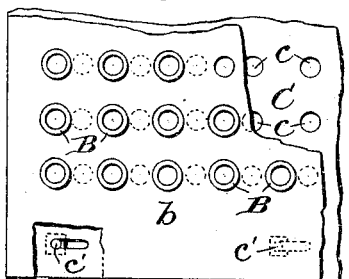
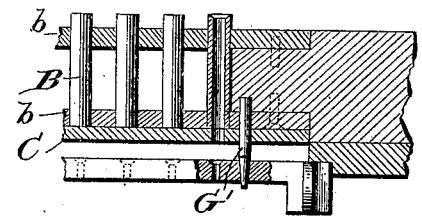
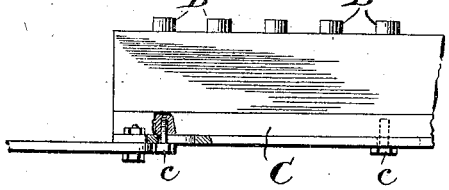
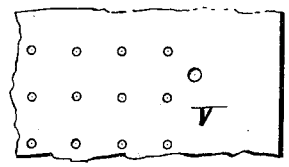
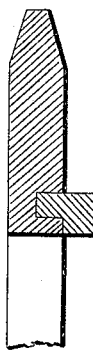
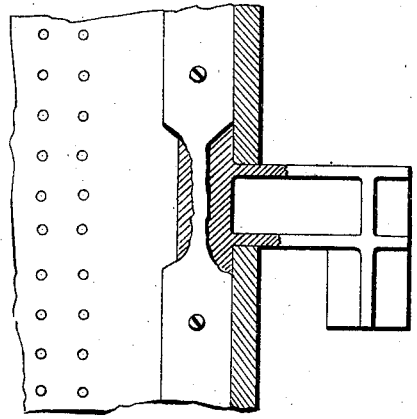
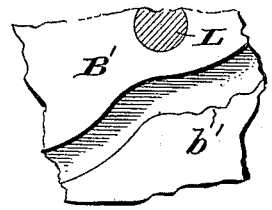
Witnesses:
Jas. C. Hutchinson.
Geo. B. Prindle.
Inventor.
Wm. E. Williams,
by Edwin J. Prindle, his atty.

UNITED STATES PATENT OFFICE.

WILLIAM ERASTUS WILLIAMS, OF CHICAGO, ILLINOIS, ASSIGNOR, BY MESNE ASSIGNMENTS, TO DIAMOND MATCH COMPANY, A CORPORATION OF ILLINOIS.

MATCH-SPLINT-ASSEMBLING MACHINE.

No. 795,877.     Specification of Letters Patent.     Patented Aug. 1, 1905.

Application filed August 8, 1898. Renewed November 1, 1900. Serial No. 35,145.

*To all whom it may concern:*

Be it known that I, WILLIAM ERASTUS WILLIAMS, of Chicago, in the county of Cook and State of Illinois, have invented certain new and useful Improvements in Match-Splint-Assembling Machines; and I do hereby declare that the following is a full, clear, and exact description thereof, reference being had to the accompanying drawings, in which—

Figure 1:
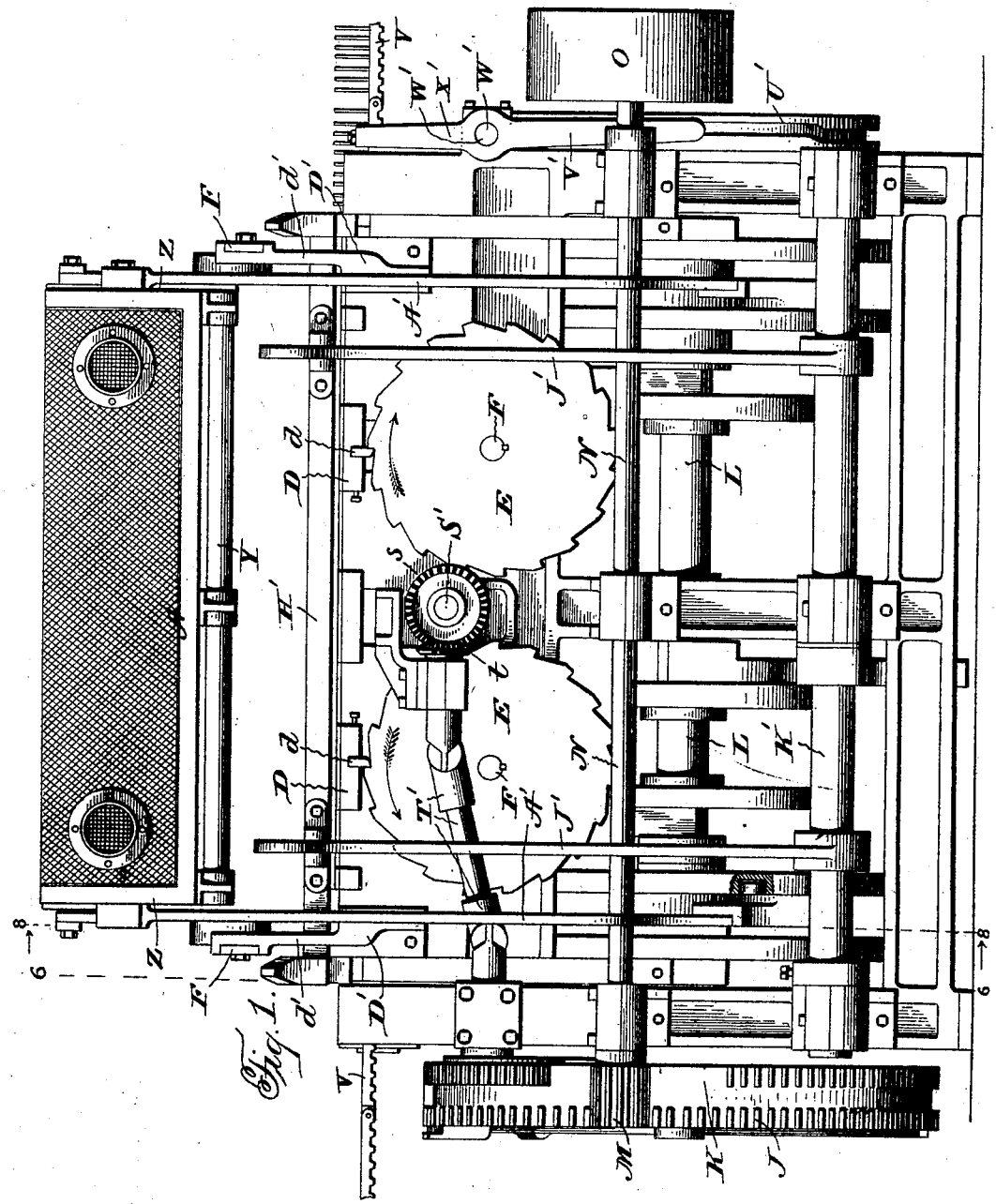
Figure 2:
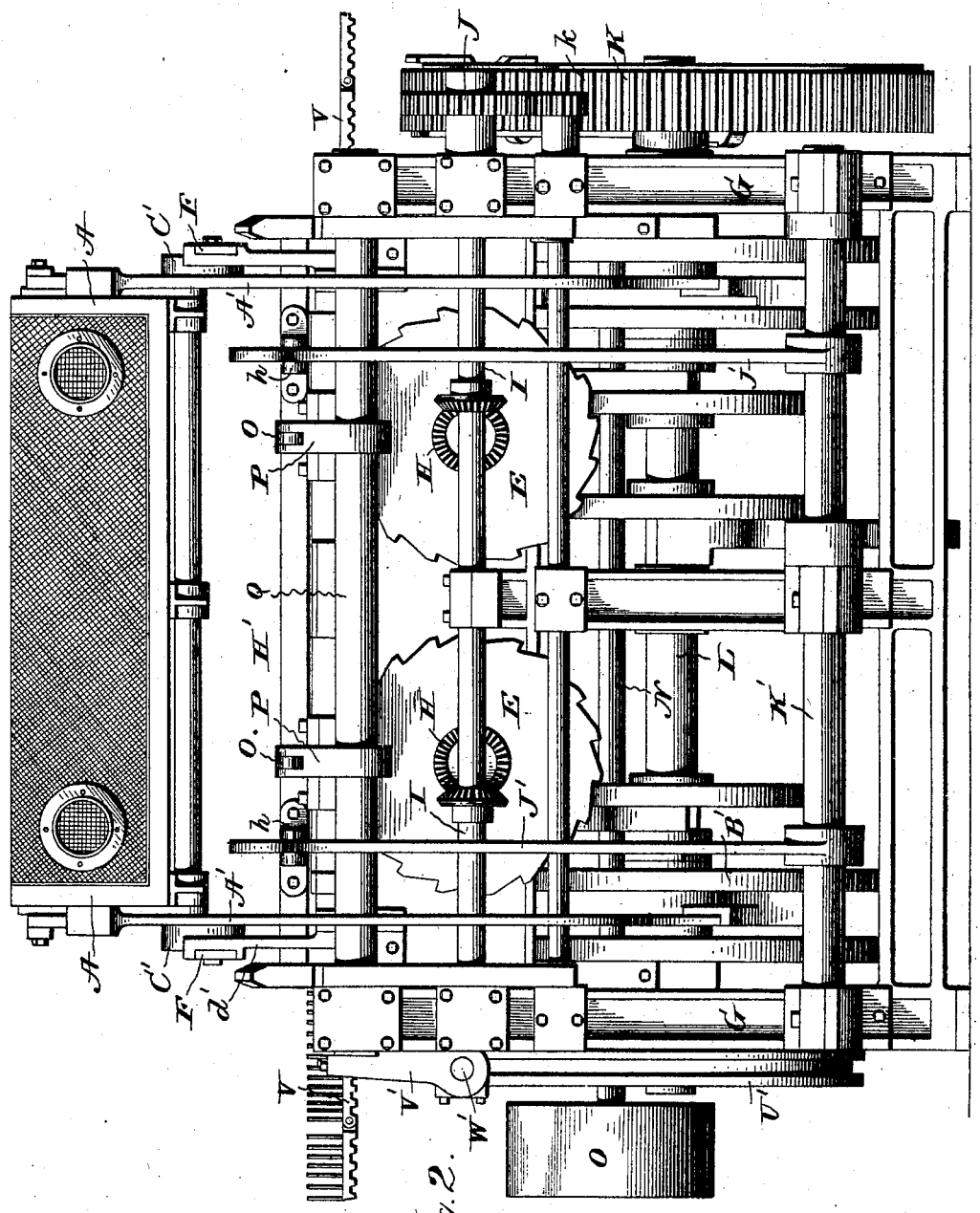
Figure 3:
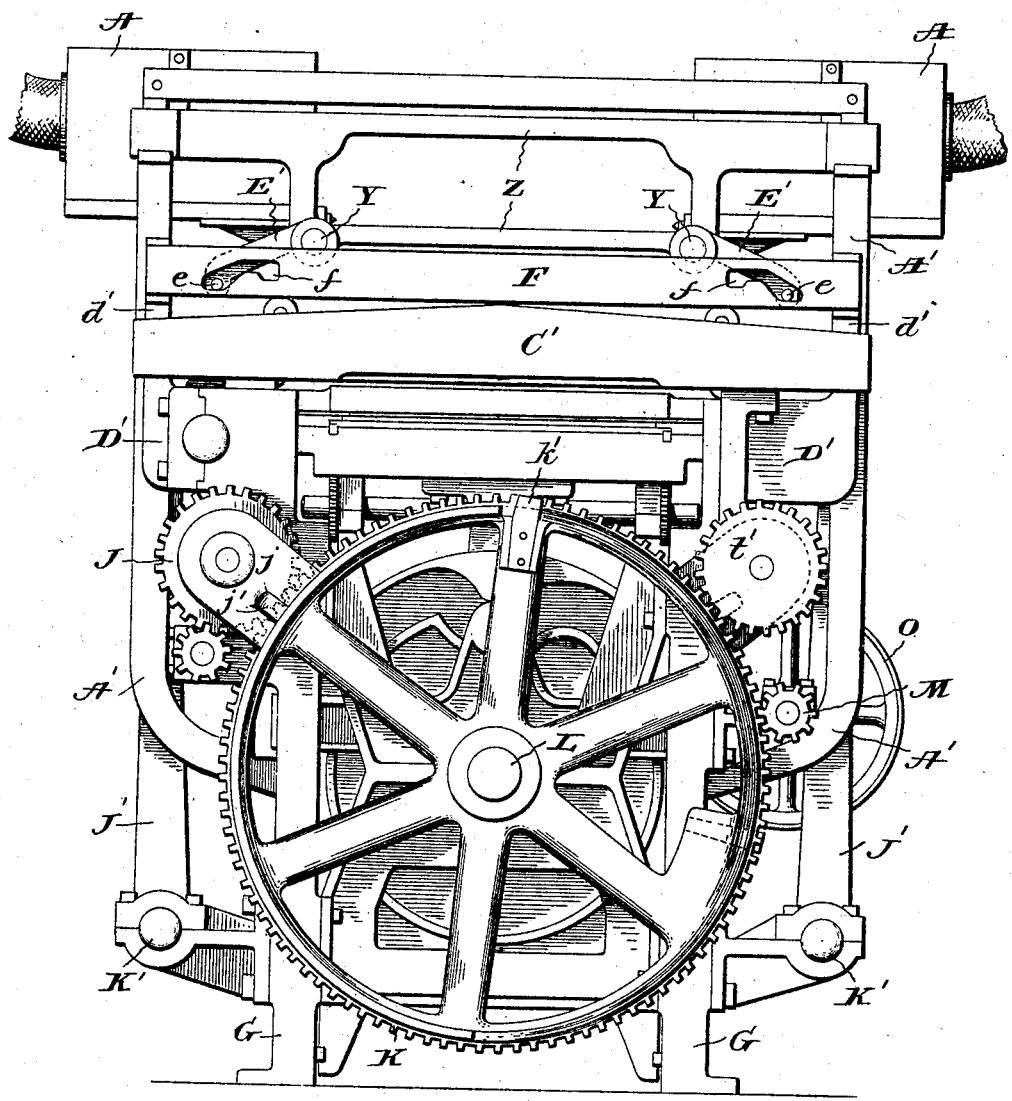
Figure 4:
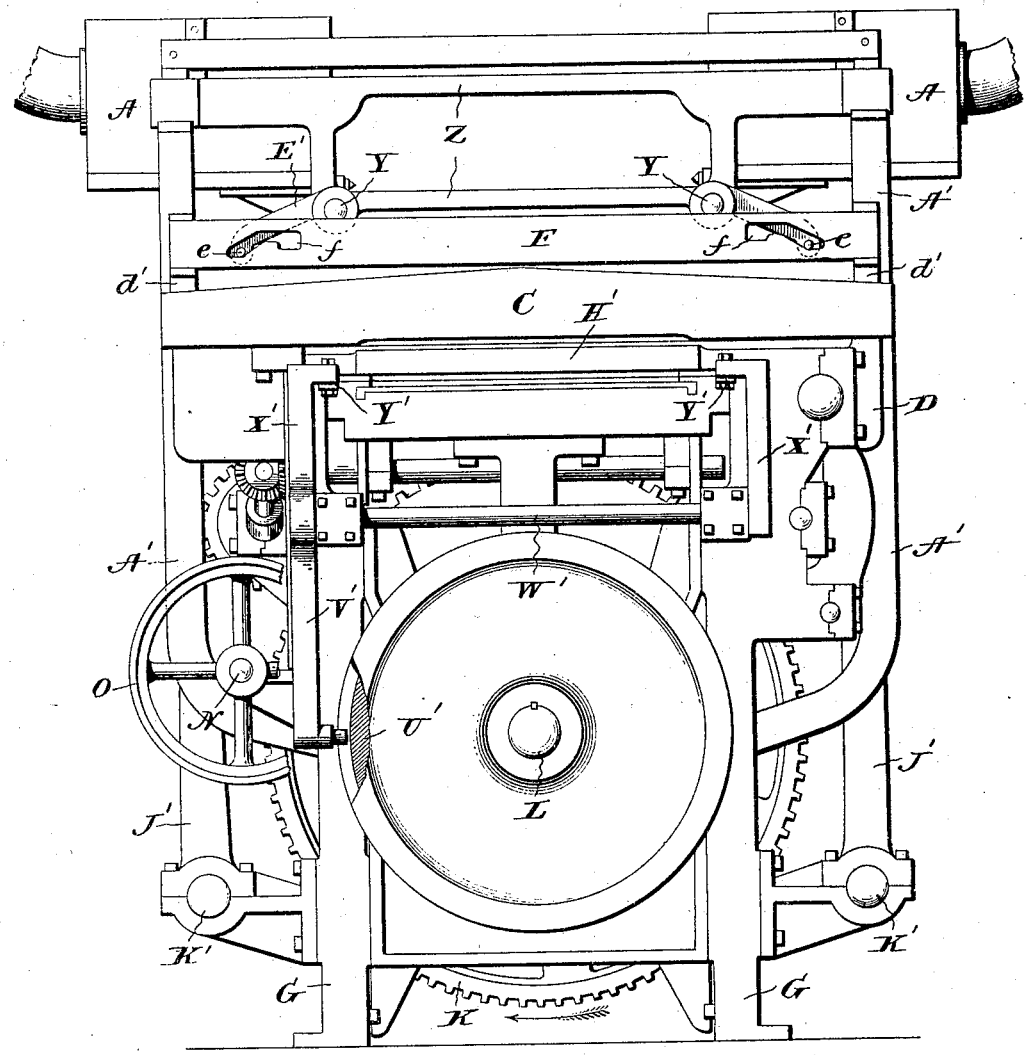
Figure 5:
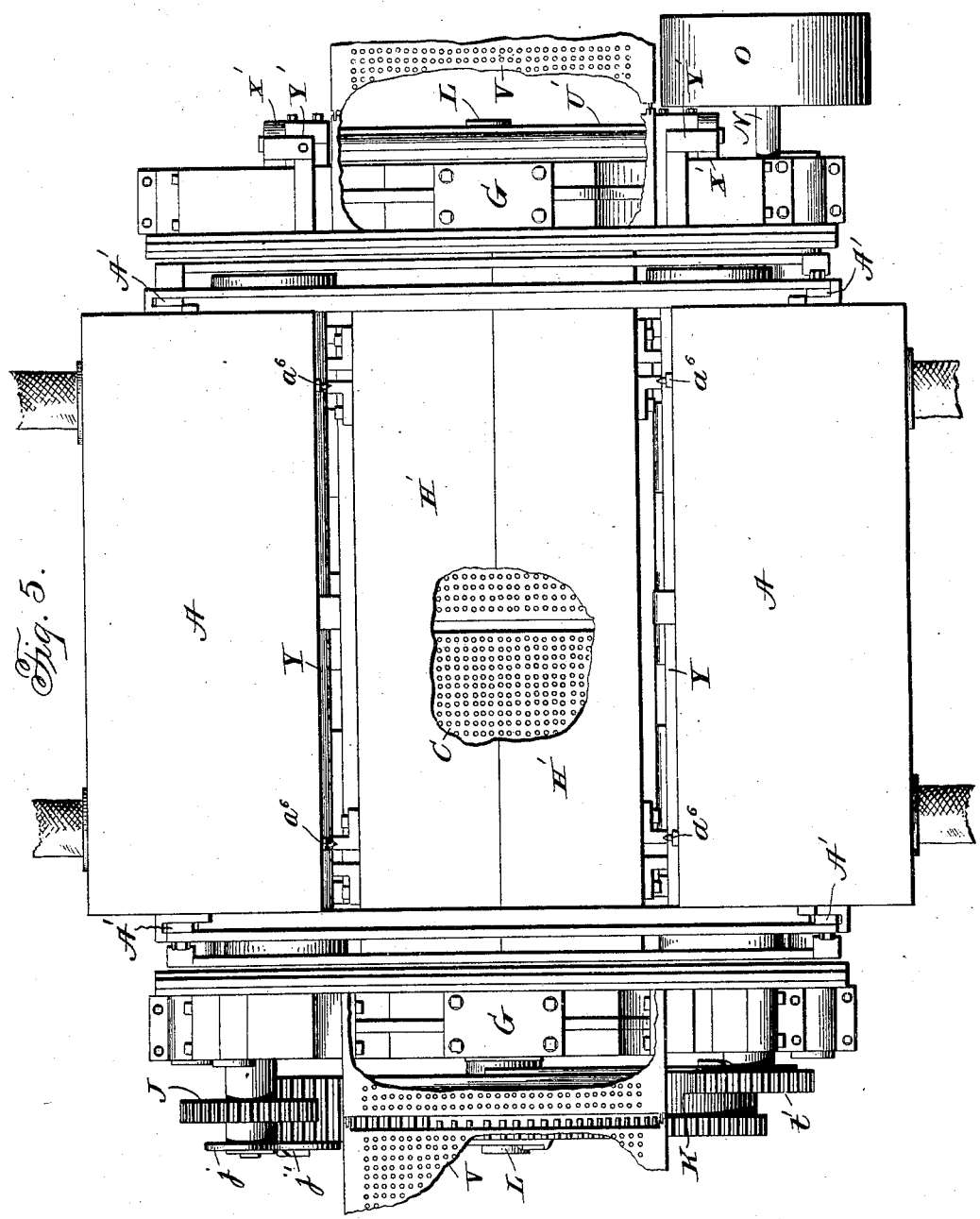
Figure 6:
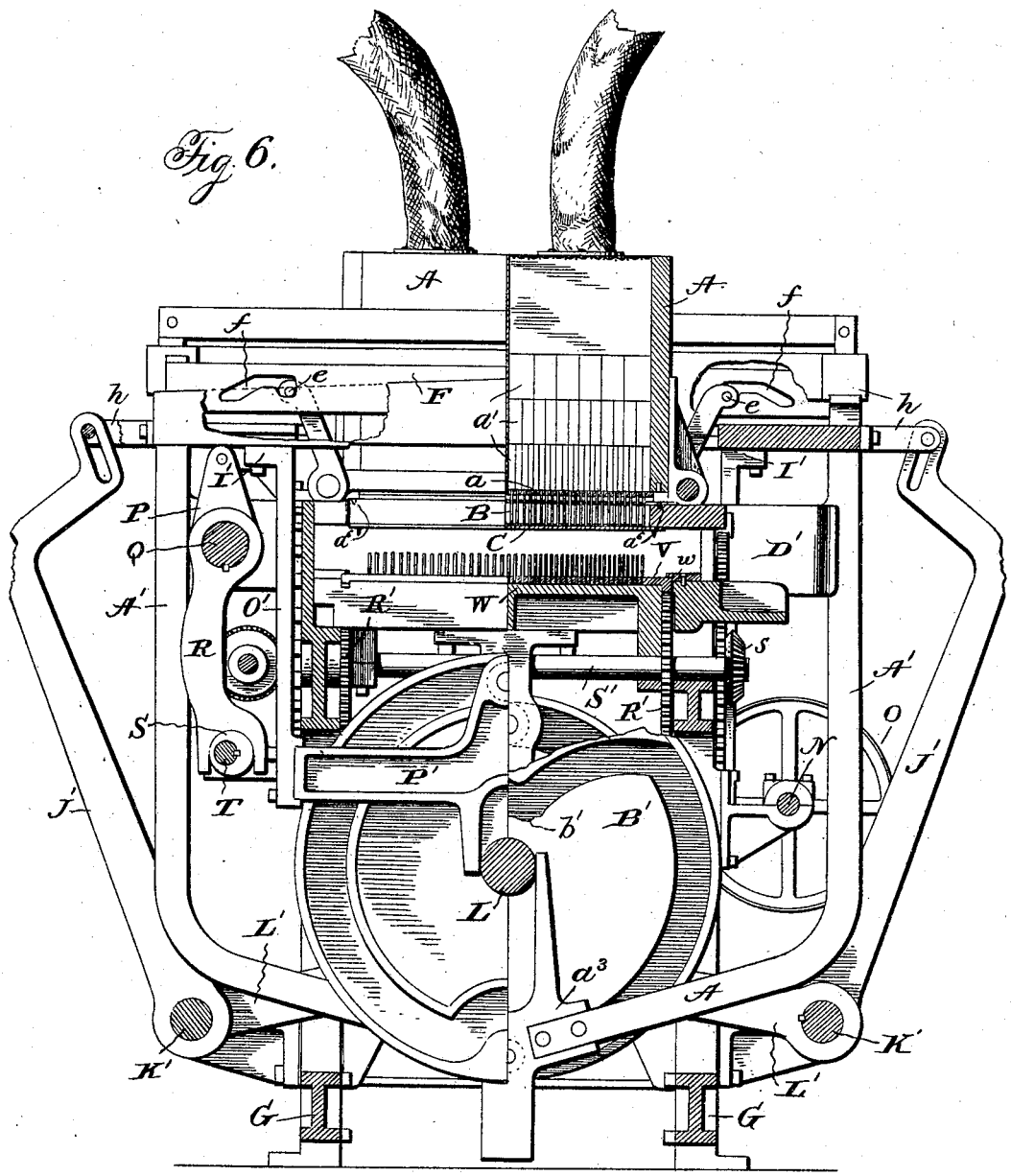
Figure 7:
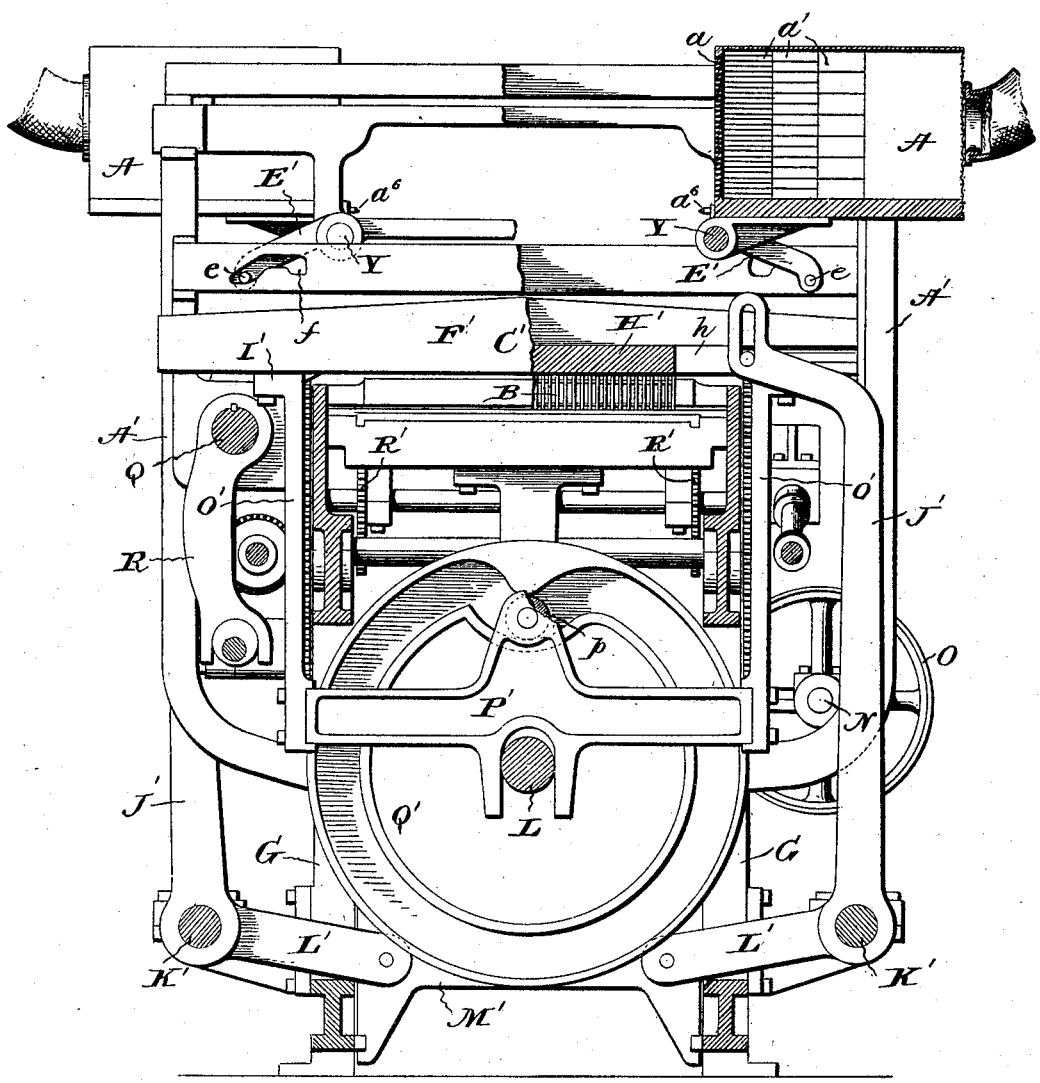

Figure 1 is a side elevation of a machine embodying my invention. Fig. 2 is a similar view of the machine illustrated in Fig. 1, the view being taken from the opposite side. Figs. 3, 4, and 5 are respectively front, rear, and plan views of the said machine. Fig. 6 is a sectional view taken on the line 6 6 of Fig. 1 and looking in the direction of the arrow, parts of the machine being shown in section in another plane. Fig. 7 is a similar view, the parts being shown in the position they occupy as soon as the splints have been forced into the holder-plate. Fig. 8 is a sectional view taken on the line 8 8 of Fig. 1 and looking in the direction of the arrow, the hopper being omitted and parts of the machine being shown in section in another plane. Fig. 9 is a detail view of the mechanism for moving into and out of position the plates for forcing splints into the holder-plates. Fig. 10 is a detail view of the mechanism for moving the hopper-sections into and out of splint-delivering position. Fig. 11 is a detail view of a portion of the hopper, the spacer, and the plate for forcing splints into the holder-plate, the hopper being shown as partially raised from its position for cooperating with the spacer and the plates in position ready to descend upon the splints. Fig. 12 is a detail view of the same parts, excepting the hopper, occupying the position they are in when the splints have been forced into the holder-plate. Fig. 13 is a detail view of the hopper and spacer shown in cooperating position. Fig. 14 is a detail view showing the action of the cutting devices on a misplaced splint. Fig. 15 is a detail bottom view of the portion of the spacer. Fig. 16 is a detail view, in side elevation, of the same. Fig. 17 is a detail view in section of a portion of the spacer and a portion of one of the holder-plates. Fig. 18 is a detail view in plan of a portion of one of the holder-plates. Fig. 19 is a detail view in plan and partly in section of the movable bed or platen. Fig. 20 is a detail view in section of one of the bars that support the plates for forcing the splints into the holder-plate, and Fig. 21 is a detail view of a portion of the cam for moving the hopper-sections into and out of splint-delivering position.

The object of my invention has been to provide a machine for inserting loose match-splints into a holder or carrier, which machine shall have a high degree of efficiency and be capable of rapid and certain operation; and to such ends my invention consists in the machine for inserting match-splints hereinafter specified.

My invention relates to match-machines of the class in which the splints, having been cut in a separate machine, are placed in a hopper, from which they are delivered to dipping plates or holders.

In the carrying of my invention into practice I employ a hopper which, for reasons hereinafter given, is preferably composed of two sections A, box-like in form, having bottoms consisting of perforated plates $a$, the perforations in the plates being each of a size to admit the passage through it of but a single splint at a time and being spaced apart distances corresponding with the desired spacing of the splints in the dipping plate or holder. Each hopper-section A is divided into several series of compartments or cells $a'$ by thin walls or partitions, the cells of the several series being of different lateral dimensions, the smallest cells being next the hopper-bottom and the largest cells being those of the topmost series. The size of each of the largest cells laterally is such that splints cannot bridge across from one side thereof to the other. The hopper-bottom has from each hole thereof a short extension $a^2$, and beneath the hopper when it is in splint-discharging position is a splint-receiving spacer, conveniently made of a series of tubes B and a pair of parallel horizontal plates $b$, the tubes B being spaced apart precisely as are the perforations of the hopper-bottom and respectively alining with the extensions $a^2$ of the hopper-bottom and agreeing in diameter with that of said extensions. The height of the tubes B is less than the length of the splints, and, for reasons hereinafter to appear, the upper ends of the tubes B and the lower ends of the hopper-bottom extensions $a^2$ are sharpened to form knife or cutting edges. The bottom of the spacer is formed by a thin plate C, that is slidable to place perforations $c$ thereof into and out of alinement with the tubes, so as to respectively permit and prevent the passage of splints downward from the spacer, said plate being attached to the spacer by screws $c'$, that pass through the slots in the plate C into a convenient part of the spacer. The means for reciprocating the plate C will be described hereinafter.

The spacer and the hopper-sections resting thereon are vibrated vertically and horizontally in order to agitate the splints, so that they will pass down through the cells of the hopper-sections and arrange themselves in the spacer-tubes. For producing the desired vertical movement the spacer has on opposite sides two extensions D, on the under side of each of which is a tooth-like projection $d$, that rests upon the periphery of a disk E, having teeth of the familiar ratchet form, so that as the disk revolves the spacer will be alternately easily lifted and abruptly dropped with considerable jar. Each disk E is mounted on a horizontal shaft F, journaled in suitable bearings in the machine-frame G, and having at one end a beveled gear H, that meshes with a like gear on a horizontal shaft I. The shaft I has at one end a pinion J, which meshes with teeth $k$, forming a mutilated gear, on a wheel K, that is mounted upon a horizontal shaft L, journaled in bearings in the machine-frame, which wheel K is driven by a pinion M, that meshes with gear-teeth on said wheel, the pinion being on a driving-shaft N, having a band-wheel O. The well-known expedients used with mutilated gearing for preventing rotation of the pinion when the gear-teeth are freed therefrom and for starting the rotation of the pinion at the desired time are employed, such consisting of a plate $j$, connected to the pinion J, that engages a flange on the gear-wheel K, and a lug $k'$ on the gear-wheel at the rear end of the gear-flange, that engages a tooth or projection $j''$ on the plate $j$. For imparting horizontal motion to the spacer and the hopper-sections resting thereon the spacer at one side is connected by links O to cranks P on a rock-shaft Q, which is rocked or oscillated by two levers R, which are vibrated by eccentrics S on a shaft T, which is revolved from the intermittently-rotated pinion M through a pinion U on the shaft T, which meshes with said pinion M.

The present machine is designed for filling a splint-holder of the well-known construction, consisting of perforated plates V, that are pivotally connected at their edges in an endless chain. It is to be understood, however, that the scope of the invention is not restricted to the use of any particular form of splint-holder, as holders of other types may be used. The plate or holder to be filled is supported beneath the spacer on a bed or platen W, which is movable vertically toward and from the spacer, the plate on opposite sides being overlapped by strips $w$, that hold it in position against upward lateral movement. For so moving and supporting the bed or platen there project from its under side two bars $w'$, each of which has on one side a cam-roller $w^2$, that engages the groove of a cam X on the shaft L, the lower end of the bar being preferably slotted or forked to straddle the shaft, so that the latter may support and guide it. The splints are moved from the spacer-tubes and forced into the perforations of the holder by a pressing-platen or device that acts upon the upper ends of the splints, and to enable this operation the hopper-sections are moved away from the spacer, leaving the splints in the latter with their upper ends protruding above the spacer-tubes. Another object in having the hopper movable from the spacer is to lift or remove from the spacer any splints that may only be partially passed into the spacer-tubes. Besides having a vertical movement to lift it the hopper is preferably given also a swinging or turning movement to place it upon its side, the object of this movement being to prevent splints dropping from the hopper and also to enable the splints therein to be straightened. For thus moving the hopper I preferably employ a construction by which the lifting and swinging of the hopper-sections are simultaneously effected, but of course I do not limit myself to such an arrangement.

Each hopper-section at its lower outer corner is mounted on a horizontal shaft Y, which is journaled at its opposite ends in two bars Z. Each of the bars Z at both ends is slotted, and passing through each slot is the upper end of a vertical bar A'. The lower ends of the bars A' are carried inward and connected to a plate $a^3$, having on one side a cam-roller $a^4$, that enters the groove of a cam B'. Beneath the bars Z the vertical bars A' have shoulders $a^5$ to engage said bars Z, when by the action of the cams B' the bars A' are lifted, and thereby the bars Z be lifted. The bars A' are connected together in pairs by cross-bars C', and each bar A' is guided in its vertical movements by a block D', attached to the machine-frame G. Attached to each shaft Y is a pair of crank-arms E', from each of which a stud or pin $e$ projects laterally into a slot $f$ in a bar F', which is attached to and supported by extensions $d'$ of the guide-blocks D'. The slots $f$ have such shape that as the shafts Y and their crank-arms are moved upward said slots, acting on the pins or studs $e$, will turn the shafts and swing the hopper-sections over upon their sides. On the descent of the shafts and crank-arms the hopper-sections will be restored to their vertical position. While in their raised and overturned position, the hopper-sections are preferably vibrated to agitate the splints in them, such vibration being conveniently effected by providing the groove of the cam B' with several ruts or irregular surfaces b'. The relative sizes of the pins or studs e and the slots f are such as to permit the hopper-sections to be vibrated in both of their positions, and the bars Z are slotted for the passage of the bars A', so that the horizontal vibrations of the hopper-sections when resting on the spacer may take place. To insure alinement of the perforations in the bottom of the hopper and the spacer-tubes, pins or studs $a^6$ on the hopper enter holes in the spacer, and to insure alinement of the holes of the carrier-plate with the splints in the spacer pins or studs G' on the under side of the spacer enter holes in the holder-plate. (See Figs. 8 and 18.)

The device for pushing the splints from the spacer and into the holder-plate as I have embodied it in the machine illustrated consists of a two-part flat platen H', the parts or plates of which are mounted at their opposite outer edges in horizontal grooves in a pair of guide-bars I'. Connected to brackets h on the outer sides of each plate H' are the upper ends of two levers J', fastened at their lower ends upon a rock-shaft K', journaled in bearings on brackets attached to the machine-frame G. Secured to each shaft K' is an arm L', that is pivotally connected to a vertically-movable frame M', having a cam-roller m, that engages the groove of a cam N' on the shaft L. (See Figs. 1, 6, 7, 8, and 9.) By the mechanism described the plates H' are moved to a position above the spacer when the hopper-sections have been lifted and they are withdrawn from such position just before the hopper returns to its splint-discharging position above the spacer. The bars I', which support and guide the plates H', are vertically movable, each being for this purpose mounted upon a frame (see Fig. 8) that consists of vertical side bars O', to the upper ends of which the bars I' are attached, and a horizontal bar P', that unites the vertical bars at their lower ends. On the side of the bar P' is a cam-roller p, that engages the groove of a cam Q' on the shaft L, the frame and the bar I' supported thereby being thus raised and lowered. The connection between the plate-brackets h and the levers J' is a pin-and-slot connection, so that vertical movements of the plates can take place.

For moving the holder-plates to and from position for receiving splints said plates have on their under side at opposite edges rack-teeth r, with which respectively mesh gear-wheels R' on a shaft S', journaled in bearings on the movable bed or platen W. (See Fig. 8.) On one end of said shaft is a beveled gear s, which meshes with a like gear t on a shaft T', that has a pinion t', adapted to be driven by teeth on the wheel K, which form a mutilated gear, the movements of the splint-holder plates being of course intermittent. The shaft T' has universal joints in it, and it is extensible and contractible to enable the shaft S' to rise and descend, as it must, since it is connected to the movable bed or platen W. As in the case of the other mutilated gear and pinion, the usual devices are employed to restrain the pinion T' from rotation and to start it.

The movements of the cut-off plate or gate C to permit or prevent passage of splints from the spacer are produced by a cam U' on the shaft L, which acts on a lever V' on a rock-shaft W', that has two crank-arms X', which are connected by links Y' to said plate.

Splints may be placed in the hopper in any suitable manner. A convenient way of doing this is to connect each hopper-section A by means of a flexible pipe or pipes Z' with a source of supply of splints.

It is thought the operation of the machine has been made sufficiently plain without requiring special description thereof. It will be understood that for each revolution of the shaft L splints will be delivered to the spacer, the hopper-sections moved from position over the spacer, the cut-off plate or gate beneath the spacer moved to permit passage of the splints, the plates H' moved into position above the splints in the spacer, said plates H' and the movable bed or platen W, supporting a holder-plate, moved toward each other, and splints thereby forced into the holder-plate, said plates H' and said bed or platen with the holder-plate filled with splints recede from each other, the bed or platen descend to carry the splints now thrust into the holder from the spacer-tubes, the plates H' retracted from position over the spacer, the cut-off plate or gate returned to position to close the bottoms of the spacer-tubes, the hopper-sections returned to position for delivering a new set of splints to the spacer, the filled holder-plate moved onward on its way to carry the splints to the various devices or mechanisms for completing the matches, and a plate to be filled moved into position to receive splints. Any splints that may fall out of place and lie across the tubes of the spacer-tube will when the plates H' descend be cut in pieces by the sharp upper edges of the tubes, and the pieces fall either outside of the tubes or through the tubes to the holder-plate beneath, and by the latter be removed. If when the hopper-sections are lifted any splints protrude from the bottom thereof, as illustrated in Fig. 13, they will on the descent of the hopper either pass into the spacer-tubes or be pushed up into the hopper. Should they, however, as illustrated in Fig. 14, project so as to be caught between the cutting edges of the spacer-tubes and the hopper-bottom extensions, they will be cut in two.

It is to be understood as to those features of my invention that are capable of use in machines other than those of the class which I have illustrated and described I regard myself entitled irrespective of the kind of machine in which they are embodied.

What I claim is—

1. The combination of a splint-holder, a hopper for splints, normally with its outlet in position to deliver splints to the holder, a pivotal support for the hopper, and means to turn it on its support to shift it from its normal position to one on its side, substantially as and for the purpose described.

2. The combination of a splint-holder, a hopper to contain a mass of splints, normally immediately over the holder, and means to periodically turn the hopper on its side, substantially as and for the purpose described.

3. The combination of a normally upright hopper, having upwardly-open cells, means for turning the hopper upon its side, and means for vibrating it while so turned, substantially as and for the purpose described.

4. The combination of a normally upright hopper, a pivotal support therefor, means for turning the hopper on its support to place it in a horizontal position, and means for vibrating it while so turned, substantially as and for the purpose described.

5. The combination with a hopper having upwardly-open cells, and standing normally in an upright position, means for turning the hopper from such position, and means for vibrating it while in its normal and changed positions, substantially as and for the purpose described.

6. The combination with a normally upright hopper having its lower part divided into upwardly-open cells, means for turning the hopper to a horizontal position, and means for vibrating it while in both positions, substantially as and for the purpose described.

7. The combination of a splint-holder, a source of supply of splints, and a platen movable between the holder and the source of supply that engages the ends of splints to be thrust into the holder, substantially as and for the purpose described.

8. The combination of a splint-holder, a shiftable hopper, and a platen movable between the holder and hopper that engages the ends of splints to be moved into the holder, substantially as and for the purpose, described.

9. The combination of a splint-holder, a hopper normally in position to deliver splints to the holder, a platen, means to move the hopper from such position, and means to automatically place the platen in splint-engaging position when the hopper has been so moved, substantially as and for the purpose described.

10. The combination of a splint-holder, a shiftable source of supply of splints, a platen movable into and out of position to engage splints, and a splint-spacer between the splint-holder and the platen, substantially as and for the purpose described.

11. The combination of a splint-holder, a source of supply of splints, a platen movable into and out of position to engage splints, a splint-spacer between the splint-holder and the platen, and means for moving the platen in a direction to move splints into the holder, substantially as and for the purpose described.

12. The combination of a splint-holder, a source of supply of splints, a platen movable into and out of position to engage splints, a splint-spacer between the splint-holder and the platen, and means for moving the holder in a direction parallel with the lengths of the splints, substantially as and for the purpose described.

13. The combination of a splint-holder, a source of supply of splints, a platen movable into and out of position to engage splints, a splint-spacer between the splint-holder and the platen, and means for moving the holder and the platen in a direction parallel with the lengths of the splints, substantially as and for the purpose described.

14. The combination of splint-spacing devices, a splint-holder to receive splints therefrom, a platen to engage the ends of splints opposite the holder, and means for moving the holder and platen oppositely, first toward and then away from each other, substantially as and for the purpose described.

15. The combination of splint-spacing devices that hold splints intermediate their ends, a splint-holder to receive splints therefrom, a platen to engage the projecting ends of splints opposite the holder, and means for moving the holder and platen oppositely, first toward and then away from each other, substantially as and for the purpose described.

16. The combination, of a splint-holder, a splint-spacer, and a flat platen that engages the ends of splints in the spacer and acts to force the splints into the holder, substantially as and for the purpose described.

17. The combination of a splint-holder, a splint-spacer having splint-receiving openings shorter than a splint, and a flat platen that engages the projecting ends of the splints in the spacer and acts to force the splints into the holder, substantially as and for the purpose described.

18. The combination of a splint-holder, a splint-spacer having splint-receiving openings shorter than a splint, and a movable flat platen that engages the projecting ends of the splints in the spacer and acts to force the splints into the holder, substantially as and for the purpose described.

19. The combination of a splint-holder, a splint-spacer, a flat platen that engages the ends of splints in the spacer, and mechanism for moving the platen to force the splints into the holder.

20. The combination of the spacer having splint-receiving openings, adapted to contain but one splint each, a platen arranged to advance against the ends of the splints in the spacer, and devices on the opposite side of the spacer to receive the splints from the spacer, substantially as and for the purpose described.

21. The combination of the spacer having splint-receiving openings adapted to contain but one splint each, a flat platen to force the splints through the spacer, a holder on the opposite side of the spacer, and means to simultaneously move the platen and holder toward the spacer, substantially as and for the purpose described.

22. The combination of a splint-spacer having splint-receiving openings, means for supplying splints to the latter, a splint-holder below the spacer, a platen above the spacer, and means to move the platen vertically, substantially as and for the purpose described.

23. The combination of a splint-hopper having single-splint openings in its bottom, a spacer having splint-receiving openings whose ends toward the hopper have cutting edges, and means to move the hopper to and from the spacer, substantially as and for the purpose described.

24. The combination of a splint-hopper having in its bottom single-splint openings surrounded by tubular projections, a spacer having splint-receiving tubes with cutting edges, and means for moving the hopper to and from a position with its tubular projections alining with the spacer-tubes, substantially as and for the purpose described.

25. The combination of a splint-hopper having in its bottom a series of tubes with cutting edges, a spacer having a corresponding series of tubes with cutting edges, and means for raising the hopper from and lowering it to a position where its tubes register with those of the spacer, substantially as and for the purpose described.

26. The combination of a set of splint-receiving tubes, whose ends have cutting edges, and a platen movable toward and from the cutting edges of the tubes, substantially as and for the purpose described.

27. The combination of a set of splint-receiving tubes, whose ends have cutting edges, a platen parallel with the plane of said cutting edges, and normally away from the latter, and means for moving the platen toward the cutting edges, substantially as and for the purpose described.

28. The combination of a source of supply of splints, a set of vertical tubes to which splints are delivered, the upper ends of the tubes being provided with cutting edges, and a platen movable toward and from said cutting edges, substantially as and for the purpose described.

29. The combination of a splint-holder, a spacer to hold splints in position for entering the holder, a platen, means for moving the platen to position over the spacer opposite the holder, and means for moving it toward the spacer, substantially as and for the purpose described.

30. The combination of a splint-holder support, a splint-spacer above the same, a platen, means for moving the platen over the spacer and down upon the splints therein, and means for raising and lowering the holder-support, substantially as and for the purpose described.

31. The combination of a splint-hopper, a spacer that receives splints therefrom, having splint-receiving openings, means for opening and closing the lower ends of the spacer-openings, a platen below the spacer, a splint-holder supported by said platen, a platen at the side of the spacer, and means for moving said platen over and toward the spacer, substantially as and for the purpose described.

32. The combination of a splint-hopper, a spacer that receives splints from the hopper, having splint-receiving openings, a cut-off plate for the latter, a splint-holder support below the spacer, means for vibrating the hopper, means for turning it on its side out of splint-discharging position, a platen at the side of the spacer, and means for moving the platen over and toward the spacer, substantially as and for the purpose described.

33. The combination of a splint-spacer having openings for single splints, a cut-off plate, and a hopper normally over the spacer, means for vibrating the spacer and hopper, means for separating the spacer and hopper, a splint-holder below the spacer, and a platen movable to a position above the spacer for forcing the splints from the latter into said holder after the separation of the hopper and spacer.

34. The combination of a splint-spacer having openings for single splints, a cut-off plate, a hopper normally over the spacer, means for vibrating the spacer and hopper, means for lifting the hopper from the spacer, a splint-holder below the spacer, and a platen movable to a position above the spacer for forcing the splints from the latter into said holder after the separation of the hopper and spacer.

35. The combination of a splint-hopper, a spacer having openings for single splints, means for vibrating the hopper and spacer, a cut-off plate below the spacer, means for raising the hopper from the spacer, a splint-holder below the cut-off plate, and means for moving the holder onward, substantially as and for the purpose described.

36. The combination of a splint-hopper, a spacer below the same, means for lifting the hopper, a platen, means for carrying it laterally over the splints in the spacer, a splint-holder below the spacer, and means for moving the holder toward the spacer to engage the same with the splints therein, and for withdrawing it to remove the splints from the spacer, substantially as and for the purpose described.

37. The combination of a splint-hopper arranged for rising, turning on its side, and for vibration in either position, a spacer below the normal position of the hopper, a vertically-movable platen for supporting a splint-holder below the spacer, a rotary shaft, and means whereby each rotation of the shaft causes each of the parts to perform its functions, substantially as and for the purpose described.

38. The combination of a splint-hopper, a spacer that receives splints therefrom, the hopper being normally over the spacer, a splint-holder below the spacer, a platen supporting the holder, means for moving the hopper from over the spacer, a second platen, and means for moving it to and from position over the spacer, when the hopper is out of the way, substantially as and for the purpose described.

39. The combination of a splint-hopper, a spacer that receives splints therefrom, the hopper being normally over the spacer, a platen supporting the holder, means for lifting the hopper from the spacer, a second platen, and means for moving it laterally to and from a position over the spacer, while the hopper is out of the way, substantially as and for the purpose described.

40. The combination of a splint-spacer, a hopper normally above the spacer, means for vibrating both hopper and spacer, means for moving the hopper from the spacer, and means for vibrating it independently of the spacer, substantially as and for the purpose described.

41. The combination of a splint-spacer having openings for loosely holding single splints, a hopper normally above the spacer, means for vibrating both hopper and spacer, means for turning the hopper upon its side, and means for vibrating it when so turned, substantially as and for the purpose described.

42. The combination of a splint-hopper, a device to receive splints therefrom, a divided splint-engaging platen hinged supports for the parts of the platen, and means for swinging said parts into and out of active position, substantially as and for the purpose described.

43. The combination of the splint-hopper, a device to receive splints therefrom, a divided splint-engaging platen, and means to move the divisions of the platen into and out of position for operation.

44. The combination of a splint-hopper, a splint-receiving device below the same, a divided splint-engaging platen, and means for interposing the parts thereof between the hopper and said device, substantially as and for the purpose described.

45. The combination of a splint-hopper, a spacer below the same, means for moving the hopper from the spacer, a divided platen and means for moving the parts thereof into and out of the space presented above the spacer by said movement of the hopper, substantially as and for the purpose described.

46. The combination of a splint-spacer having openings for single splints, a plurality of splint containing and discharging hoppers, supports therefor whereby the hoppers are movable in opposite directions over and away from said spacer and whereby said hoppers, when over the spacer, lie in close relation to each other to form in effect, a single hopper, a holder, and means for introducing thereto the splints in the spacer when the hoppers are away from the spacer.

47. The combination of a splint-spacer having openings for single splints, a plurality of splint containing and discharging hoppers, pivotal supports therefor whereby the hoppers are movable in opposite directions over and away from said spacer and whereby said hoppers when over the spacer lie in close relation to each other to form, in effect, a single hopper, means for turning the hoppers on their pivotal supports, a holder, and means for introducing thereto the splints in the spacer when the hoppers are away from the spacer.

48. The combination of a movable splint-hopper, and a flexible splint-supplying tube connected therewith, substantially as and for the purpose described.

49. The combination of a splint-hopper, movable from a vertical to a horizontal position, and a flexible splint-supplying tube connected therewith, substantially as and for the purpose described.

Signed by me at Chicago this 7th day of July, 1898.

WILLIAM ERASTUS WILLIAMS.

Witnesses:
C. E. ROBINSON,
HERBERT L. CRYSLER.